United States Patent [19]

Schmunck et al.

[11] 4,235,422

[45] Nov. 25, 1980

[54] FLAME CUTTING INSTALLATION

[75] Inventors: Karlheinz Schmunck, Offenback; Klaus Herbener, Bruchköbel; Alfred Baier, Kronberg; Alfred Pfeuffer, Neu-Isenburg, all of Fed. Rep. of Germany

[73] Assignee: Messer Griesheim GmbH, Frankfurt am Main, Fed. Rep. of Germany

[21] Appl. No.: 54,014

[22] Filed: Jul. 2, 1979

[30] Foreign Application Priority Data

Aug. 24, 1978 [DE] Fed. Rep. of Germany ....... 2836958

[51] Int. Cl.³ .............................................. B23K 7/00
[52] U.S. Cl. .................................................... 266/50
[58] Field of Search ............................ 266/50, 49, 48

[56] References Cited

U.S. PATENT DOCUMENTS

| | | | |
|---|---|---|---|
| 3,851,864 | 12/1974 | Miller | 266/49 |
| 4,143,860 | 3/1979 | Herberer et al. | 266/50 |

*Primary Examiner*—M. J. Andrews
*Attorney, Agent, or Firm*—Connolly and Hutz

[57] ABSTRACT

A flame cutting installation with at least one flame cutting aggregate for cutting continuously cast workpieces in a cutting zone is provided with a noise protection device which encloses the installation from the environment with the noise protection device enclosing only the cutting zone.

9 Claims, 3 Drawing Figures

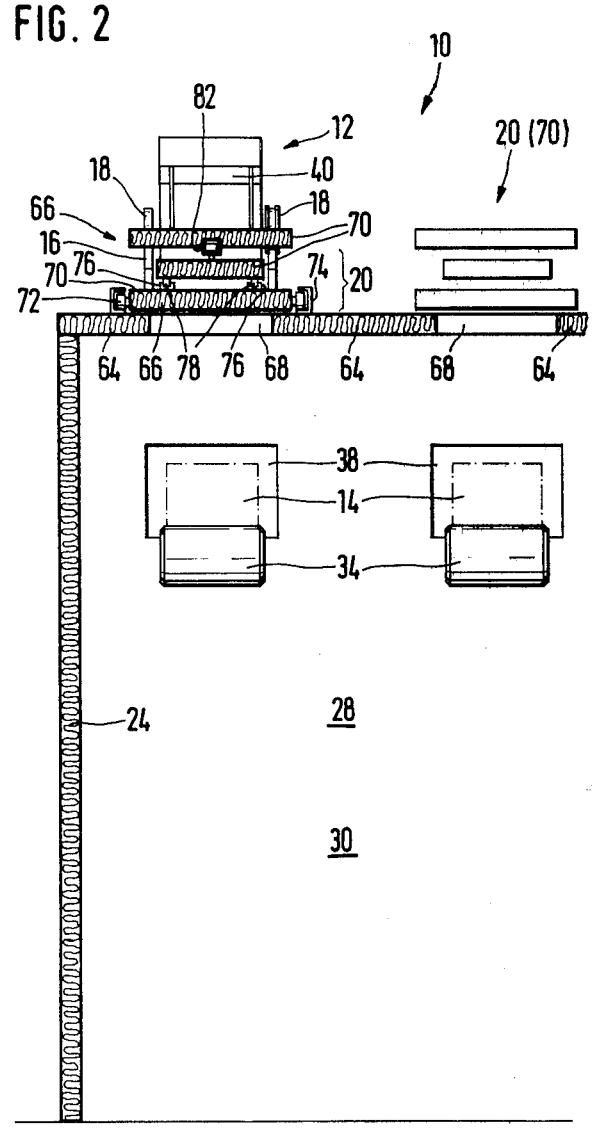

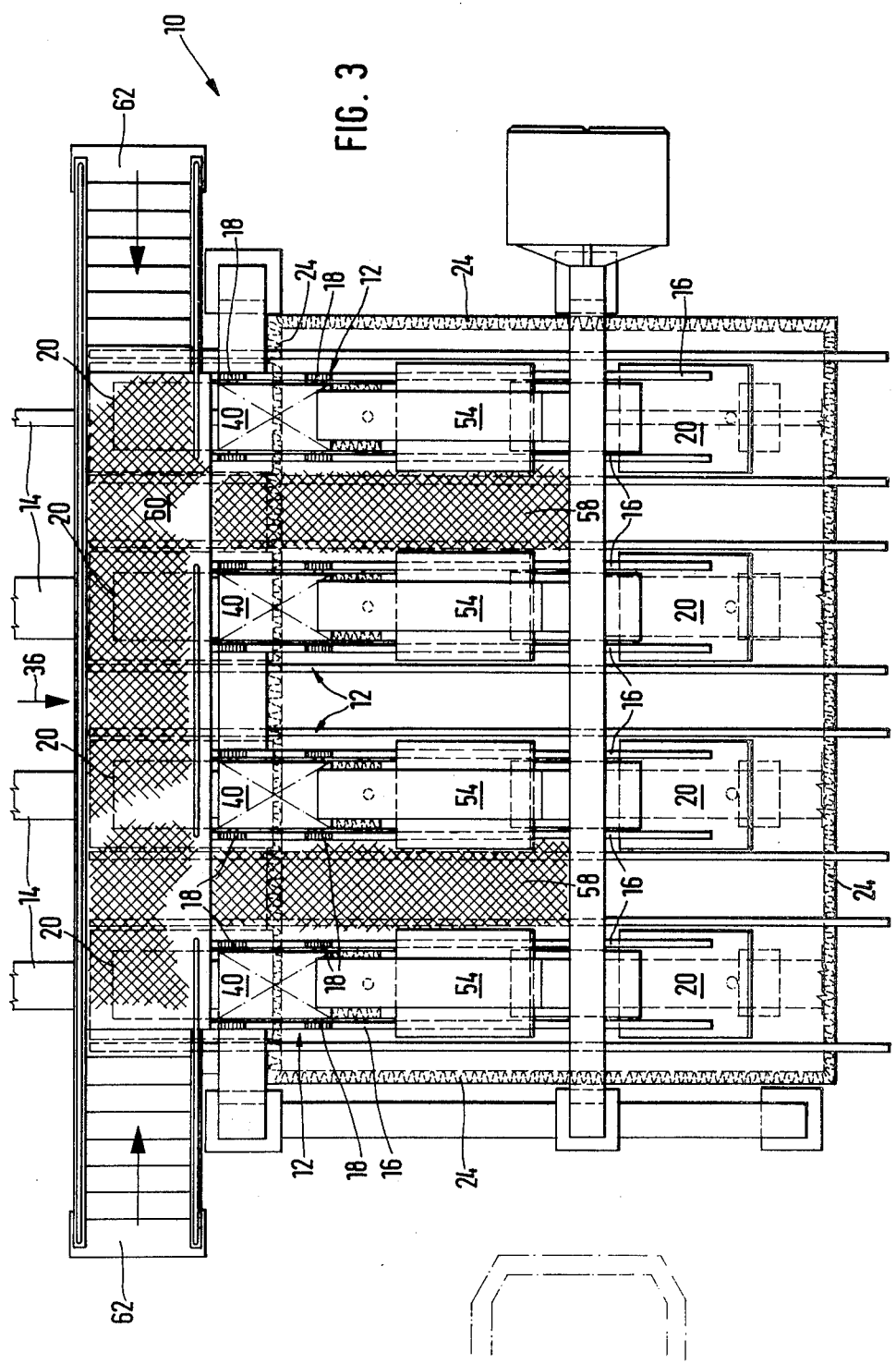

FLAME CUTTING INSTALLATION

BACKGROUND OF THE INVENTION

The invention relates to a flame cutting installation with one or more flame cutting aggregates for cutting continuously cast workpieces or bars, with a noise protection device which encloses the installation from the environment.

Mechanical flame cutters, the noise level of which can amount to up to 110 dB (A) are used for cutting a continuously cast bar. Based on the required high cutting capacity and operating safety, it is not possible to reduce the noise level at the mechanical flame cutters to below 90 or 85 dB (A) resp. as is required according to certain currently applying legal regulations. The noise which is generated during flame cutting must, therefore, be reduced by secondary measures in order to protect the flame cutting machine environment from undesirable noise.

This is especially necessary when for economical reasons several bars are cast simultaneously and it is, therefore, also necessary to cut these bars simultaneously by the corresponding number of flame cutting aggregates.

One such a multiple-bar flame cutting installation is, for example, described in the special 5/77 edition "ENVIRONMENTAL PROTECTION DURING THE USE OF BAR FLAME CUTTING MACHINES AND SCARFING APPARATUS IN THE IRON AND STEEL INDUSTRY" of the Messer Griesheim GmbH, Frankfurt/Main, the assignee herein. The six bar block installation for cutting the continuously cast bars described in this special edition is in its entirety provided in a work area insulated against noise from the environment. This work or cutting area is lined with sound proof walls and only has entrance resp. exit openings for the bars to be cut as well as an entrance door for the purpose of maintaining the flame cutting installation. Since the bars are flame-cut immediately after casting when they are still in a glowing state (bar temperature up to 1,000° C.), a very high operating temperature prevails in this cutting installation enclosed from the environment, which does not permit maintenance or repairs, for example, on a flame cutting aggregate during the casting operation.

SUMMARY OF INVENTION

Based on the knowledge gained in the construction of this known flame cutting installation, the present invention has its object of designing the flame cutting installation in such a way that even during the casting operation, maintenance or repairs of the flame cutting aggregates which are not in action at that time is possible.

In order to achieve the above-mentioned object, a flame cutting installation is provided which is characterized by the design of the noise protecting device in such a way that only the cutting zone is enclosed. The cutting zone is to be understood, on the one hand, by the cutting distance which is covered by the appropriate flame cutting aggregate from its starting position to its final position during the cutting procedure of the bar and, on the other hand, by the zone between flame cutter or clamping jaws and the bar in the cutting zone. The other components of each flame cutting aggregate such as machine body, support rolls, drive motor, pivoting drive, clamping device, gas supply apparatus etc. are, on the other hand, not arranged in the cutting zone according to the invention and are, therefore, also not enclosed. It is, therefore, possible in an advantageous way—as already mentioned—to undertake required maintenance or repairs on the flame cutting aggregate without exposing the mechanic to the noise, combustion gases generated during flame cutting and the enormous heat which is also present.

The noise protection device also consists—as up to the present—of individual sound proof walls but with the condition that according to the embodiment of the invention, a cover for the device is provided which encloses the cutting zone towards the top under the track (on which the flame cutting aggregates can be moved along) which cover according to a further proposal of the invention is composed of a stationary and an adjustable part.

In order to achieve a connection between the flame cutting aggregate and the bar to be cut which moves along underneath, a longitudinal opening is provided in the cover according to the invention in the area of the tracks through which the clamping device as well as the flame cutter of the flame cutting aggregate are guided down into the cutting zone.

As a result of this construction according to the invention it is guaranteed in any advantageous way that only the flame cutter and clamping device remain in the high level noise and heat cutting zone while the other above-mentioned parts of the flame cutting aggregate are arranged outside this zone where they are protected and accessible for maintenance. As a result of the two-part cover according to the invention (stationary and adjustable part), it is, furthermore, guaranteed that the cutting zone is enclosed, upward, sound proof, in other words, to the environment independent of the appropriate position of the flame cutting aggregate on its path from its starting position to the final position.

In order to guarantee this, the invention, furthermore, proposes to provide the adjustable part (of the cover) on the two faces of the machine body of the flame cutting aggregates.

Since the cutting zone (cutting distance) to be enclosed is variable in its dimensions as a function of the bar cross section, the bar temperature and the casting speed, the adjustable part of the cover preferably consists of individual noise insulating elements connected louvre-like with each other. These individual elements move during the process of the flame cutting aggregates toward each other like bellows and consequently always effectively cover the entire longitudinal opening above the cutting zone independent of the flame cutting aggregate position at that time.

In summary, the invention relates to flame cutting installations especially with several flame cutting aggregates which are very noise-intensive so that such installations are ordinarily being housed in separate, noise insulating protective areas. This makes a maintenance of the installation during operation, however, practically impossible. This disadvantage is avoided with the invention by designing the flame cutting installation in such a way that repair and maintenance are possible at all times without interference. This is attained in that only the actual cutting zone is enclosed, sound proof, in relation to the environment and in that the machine parts which are not directly involved with the cutting process such as drive, machine body, gas supply, etc. are provided outside of the cutting zone and accessible for maintenance.

THE DRAWINGS

FIG. 2 is a partial cross section along line A-B of FIG. 1; and

FIG. 3 is a plan view of FIG. 1 on a smaller scale.

DETAILED DESCRIPTION

Figure 1:
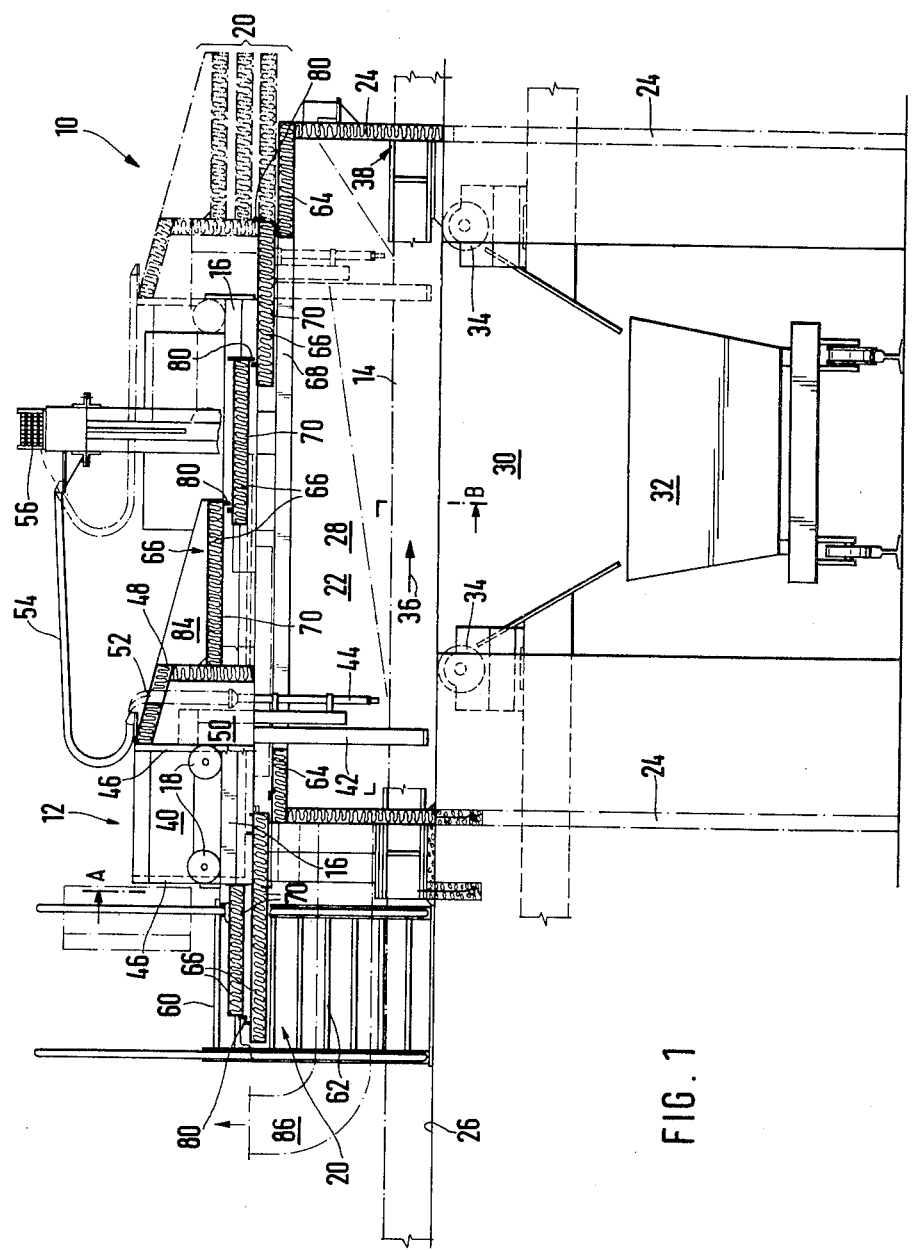
FIG. 1 is a side elevation view of the flame cutting installation according to the invention.

The flame cutting installation is characterized in the drawing, in general, with the reference number 10. This installation has in the exemplified embodiment four flame cutting aggregates 12 which are used to cut the corresponding number of bars or workpieces 14.

As can be seen in FIG. 3, four pairs of tracks 16 aligned parallel to each other are provided, on each of which one of the flame cutting aggregates 12 is arranged movable in longitudinal direction by means of its rollers 18. The tracks 16 are encased by a top cover 20 as a result of which the cutting zone 22 is completely enclosed upward. The cover 20 itself is supported by the so-called sound proof walls 24 which extend to the floor 26. A chamber 28 is, therefore, formed by the cover 20 and the sound proof walls 24 which open up in the floor area into a pit 30 in which a scrap iron cart 32 is provided to receive the scrap and the burning slag produced during flame cutting.

Several pairs of rollers 34 are recessed in the floor 26, on which the bar 14 to be cut moves along in the direction of arrow 36 at the casting speed. In the front face sound proof walls 24 of the chamber 28, openings 38 are provided through which the bar is introduced into the inside of the chamber (see FIG. 2) or leaves the chamber again (on the right in FIG. 1).

The flame cutting aggregate 12 which can be moved on preferably water cooled tracks 16 can best be seen in FIG. 1. This aggregate consists of a machine body 40, which—if necessary—is also water cooled and has in its interior the drive for the rollers 18, the hydraulics for the clamping device 42 as well as the pivoting drive for the cutting torch 44 in addition to the usual control and regulating devices otherwise needed for such flame cutting aggregates.

The right hand front face 46 of the machine body 40 of FIG. 1 is covered by a sound proof hood 48 which is open towards the bottom. The mountings of the clamping device 42 or that of the cutting torch 44 are provided in the space 50 formed between the face 46 and the sound proof hood 48. Through an opening 52 in the sound proof hood 48, the cutting torch 44 is connected with a central supply station 56 via a supply line 54, through which the necessary media such as cutting gas, heating and cutting oxygen, cooling water, etc. are supplied to the cutting torch.

As can be seen especially in FIG. 3, a common maintenance passage 58 is provided between each of two of the movable flame cutting aggregates 12. The two maintenance passages 58 in the exemplified embodiment in turn open up into a cross passage 60, at the two ends of which a ladder 62 is provided. The lengths of each maintenance passage 58 essentially corresponds to the path of movement of the flame cutting aggregate 12.

The top cover 20 according to the invention of the cutting zone 22 can best be seen in FIGS. 1 and 2. As can be seen, this cover is made in two parts and consists of a stationary part 64 as well as a movable part 66.

The stationary part 64 of the cover 20 essentially encloses the chamber 28 towards the top.

In the area of the pair of tracks 16, to be sure, between each of the tracks 16, this stationary part of the cover 20 is interrupted each time while forming a longitudinal opening 68. The length of this longitudinal opening 68 corresponds approximately to the length of the cutting distance which is covered by the flame cutting aggregate 12 in order to cut the bar 14 while the width of this longitudinal opening shown in FIG. 2 is dimensioned in such a way that all necessary movements of the clamping device 42 or the pivoting movement of the cutting torch 44 are possible without interference.

In order to make sure that the longitudinal opening 68 is always covered, sound proof, in each position of the flame cutting aggregate 12 in the area of its cutting distance, the movable part 66 of the cover 20 is connected with the machine body 40 of the aggregate 12. This movable part is used, therefore, to keep the longitudinal opening 68 closed from the environment in each position of the aggregate 12.

For this purpose, the movable part 66 is composed according to the invention of individual noise insulating elements 70 which are louvre-like interconnected with each other.

As shown in FIG. 2, the lower element 70 is equipped with lateral guide rollers 72 which can be moved in tracks 74. On the top of this lower element 70, two guide tracks 76 are, furthermore, arranged, which in turn are used to hold guide rollers 78 of the second movable element 70. The path of movement of this second middle element 70 in FIG. 2 onto the lower element 70 is limited by two stops 80 shown in FIG. 1.

The middle element 70 in FIG. 2 is now used in turn again to guide the upper element 70 as is indicated by the trackroller combination 82 (FIG. 2). This middle element 70 as well has two end stops 80 as a result of which the path of movement of the upper element 70 is also limited (FIG. 1). The upper element 70, as shown in FIG. 1, is fastened to the carrier 84 which is welded in turn on the sound proof hood 48.

The right hand movable part 66 of the cover 20 is shown in FIG. 1 in its pulled-out arrangement in which at the same time the flame cutting aggregate 12 is located in its left hand starting position. When the flame cutting aggregate 12 has been clamped down by means of its clamping device 42 on the bar 14 which moves at the casting speed in the direction of arrow 36 and the cutting procedure has, therefore, been initiated, the aggregate 12 moves at this casting speed from its left hand starting position in FIG. 1 into the schematically illustrated (right hand) final position. During the first phase of this movement, the upper element 70 moves correspondingly since it is rigidly connected via the carrier 82 with the sound proof hood 48 and rolls by means of the track-roller combination 82 on the middle element 70. At the end of this movement of the upper element 70, its stop 80 connects with the stop 80 of the middle element 70 so that now also this element is moved by the continuing motion of the upper element 70 in the direction of arrow 36. The middle element 70 moves during this process along on the track-roller combination 76, 78 on the lower element 70 and, to be sure, until it comes to its stop 80. As a result, the lower element 70 is now also moved to the right by the middle element in the direction of arrow 36 until all three elements 70 have reached their final position, shown in dotted lines, in which they are arranged on top of each other. This final position of the three elements 70 which are movable in relation to each other and are louvre-like connected with each other corresponds also with the final position of the flame cutting aggregate 12. After subsequent release of the clamping device 42 from the bar which in the meantime has been cut, the flame cutting aggregate 12 moves back again into its left hand starting position (FIG. 1) whereby now the three elements 70 are again pulled apart and assume the shown position again.

In order to also be able to cover the back area of the longitudinal opening 68 in the direction of movement of the flame cutting aggregate 12, the left face 46 of the machine body 40 in FIG. 1 is also firmly connected with a cover element 70. This cover element can be compared with the upper right hand cover element which is arranged on carrier 84. The louvre-like connection of this upper element with the lower element 70 (to be compared with the lower element 70 on the right in FIG. 1) takes place—as before—by means of stops 80. This lower element 70 is also equipped with guide rollers which are movable in longitudinal direction in corresponding tracks as described by the example of the lower element 70 on the right hand in FIG. 1. The interaction if these two elements corresponds to the three elements on the right with the exception that the middle element is absent here since it is not needed because of the shorter distance to be covered (same as longitudinal opening 68).

The elements 70 which comprise together the stationary part 64 and the movable part 66 of the cover 20 and which also comprise the remaining sound proof walls 24 are known per se. In order to form more stable walls 24, the individual elements are mounted in a frame (not shown) which provides the elements with the necessary rigidity for their application as construction elements for the chamber 28. As construction materials for the noise insulating elements, sound absorbing as well as sound inhibiting materials are available.

It is, of course, possible and lies within the scope of the invention to use a combination of sound absorbing and sound inhibiting materials for the elements. Suitable sound absorbing materials are, among others, glass and other fiber materials, open cell plastic foam materials, perforated honeycomb elements, felt as well as porous metals. Sound inhibiting materials are, for example, PB and PU foam compounds, leadimpregnated polyvinyl materials as well as other PB solid solutions.

If necessary, the space 28 can be connected with an exhaust fan via a duct 86 shown as a dotted line, which is of special advantage when cutting high alloy steels because of the very severe smoke development which occurs. In this case, it is possible and lies within the scope of the invention to supply each flame cutting aggregate with its own exhaust duct 86 or it may be sufficient, depending on the size of the duct, to provide each flame cutting aggregate with a common duct 86. The exhaust fan further guarantees that the space 28 is not excessively heated as a result of the prevailing temperatures produced by the very hot bar (up to 1,000° C.) and the additional released heat from cutting.

As a result of the cover according to the invention of the cutting zone 22 in relation to the environment, not only a noise insulation is obtained, therefore, but it is also effectively prevented that the heat forming in the cutting zone as well as the exhaust gases originating during cutting are dispersed into the environment. Based on the design according to the invention in which only the clamping device 42 and the cutting torch 44 are located in the immediate area of the cutting zone 22, while the other parts of the flame cutting aggregate 12 are arranged outside of this cutting zone 22, it is, therefore, advantageously possible without interrupting the casting and cutting operation to maintain and repair individual aggregates. The operating personnel charged with this work, therefore, are not exposed to the health-impairing effects of the cutting process (exhaust gas, heat, noise).

The chamber 28 which houses the cutting zone 22 is also enclosed from view as a result of the cover 20 of the invention, including the sound proof walls 24. A television monitoring installation is, therefore, advantageously provided the heat- and dust-proof remote controlled cameras of which monitor the cutting zone 22 and transmit the cutting process to monitors provided in the operating cubicle.

What is claimed is:

1. In a flame cutting installation having at least one movable flame cutting assembly with a flame cutting torch which moves above and across a continuously cast strand in a fixed cutting zone for transversely cutting the strand into a plurality of separate workpieces with the fixed cutting zone being defined by the area of travel of all of the torches from the beginning to the end of the cutting operation and with each torch having a movable cutting zone within the fixed cutting zone with the movable cutting zone being movable with its torch along the path of travel of its torch, the improvement being a protection device enclosing said whole fixed cutting zone in which said torches move longitudinally during the cutting operation, said protection device comprising a cover having stationary and adjustable cover parts, said adjustable cover parts being mounted to said flame cutting assembly for movement therewith, and said protection device thereby comprising means for preventing a dispersion of the noise and of the heat in said fixed cutting zone to the environment.

2. Flame cutting installation according to claim 1, the improvement being said flame cutting assembly is arranged longitudinally movably on tracks above rollers which transport the cast strand, and clamping means for clamping said assembly to the strand.

3. Flame cutting installation according to claim 2, the improvement being said cover includes parts provided underneath said tracks.

4. Flame cutting installation according to claim 3, the improvement being a longitudinal opening is provided in said cover in the area of said tracks through which said clamping means and the cutting torch of said flame cutting assembly are guided down into said fixed cutting zone.

5. Flame cutting installation according to claim 4, the improvement being said longitudinal opening over which said flame cutting assembly moves is covered by said adjustable part of said cover.

6. Flame cutting installation according to claim 5, the improvement being each of said assemblies including a machine body with two front faces, and said adjustable part of said cover being provided on said two front faces of said machine body.

7. Flame cutting installation according to claim 6, the improvement being said adjustable part of said cover consists of individual louvre-like interconnected noise insulating elements.

8. Flame cutting installation according to claim 7, the improvement being the louvre-like element which is each time the lower element of a pair of such elements is guided in longitudinal tracks and can be moved by its associated upper element.

9. Flame cutting installation according to claim 8, the improvement being said upper element is fastened to said two front faces of said machine body.

* * * * *